US012132710B2

(12) United States Patent
Gourlay et al.

(10) Patent No.: US 12,132,710 B2
(45) Date of Patent: Oct. 29, 2024

(54) CRYPTOGRAPHICALLY SIGNED NETWORK CONFIGURATIONS

(71) Applicant: Arista Networks, Inc., Santa Clara, CA (US)

(72) Inventors: Douglas Gourlay, Tahoe City, CA (US); Ethan Rahn, Santa Clara, CA (US); Fred Hsu, Sunnyvale, CA (US); Steve Magers, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 264 days.

(21) Appl. No.: 17/711,919

(22) Filed: Apr. 1, 2022

(65) Prior Publication Data

US 2023/0319018 A1    Oct. 5, 2023

(51) Int. Cl.
*H04L 9/40*      (2022.01)
*H04L 9/32*      (2006.01)
*H04L 41/0873*   (2022.01)

(52) U.S. Cl.
CPC ........ *H04L 63/0428* (2013.01); *H04L 9/3236* (2013.01); *H04L 9/3247* (2013.01); *H04L 41/0873* (2013.01); *H04L 63/0823* (2013.01)

(58) Field of Classification Search
CPC . H04L 63/0428; H04L 9/3236; H04L 9/3247; H04L 41/0873; H04L 63/0823; H04L 63/12; H04L 63/20; H04L 41/0806
USPC ....................................................... 713/168
See application file for complete search history.

(56) References Cited

U.S. PATENT DOCUMENTS

| | | | |
|---|---|---|---|
| 11,050,570 B1 | 6/2021 | Totah et al. | |
| 2003/0190046 A1 | 10/2003 | Kamerman et al. | |
| 2010/0226280 A1* | 9/2010 | Burns | H04L 63/0209 370/254 |
| 2013/0036311 A1* | 2/2013 | Akyol | H04L 63/08 713/189 |
| 2014/0325038 A1 | 10/2014 | Kis | |
| 2018/0091484 A1* | 3/2018 | Atta | H04L 63/0428 |
| 2021/0006402 A1* | 1/2021 | Ohms | H04L 9/0643 |

OTHER PUBLICATIONS

International Search Report and Written Opinion, PCT Application No. PCT/US2023/016631, mailed Jul. 11, 2023.

* cited by examiner

*Primary Examiner* — Jacob Lipman
(74) *Attorney, Agent, or Firm* — Fountainhead Law Group, PC (57) ABSTRACT

Embodiments of the present disclosure include techniques for securing the flow of configuration commands issued to network devices. When an authorized command source, such as an authorized user or program, issues a command, security data for the command is generated and associated with the command. The command and security data may flow across multiple software applications to the network device. The network device receiving the command may use the security data to verify that the command source is an authorized source and to validate that the command was unaltered.

20 Claims, 5 Drawing Sheets

CRYPTOGRAPHICALLY SIGNED NETWORK CONFIGURATIONS

BACKGROUND

The present disclosure relates generally to computer network security, and in particular, to techniques for cryptographically signed network configurations.

Computer networks are used to seamlessly move digital information between a variety of compute devices, such as servers, personal computers, or mobile compute devices. Typically, such devices are connected together through routers and switches and other network devices. Security in such an environment can be a significant challenge. For example, it is generally desirable to ensure that only authorized users are allowed to modify configurations of a network device, such as network traffic flows. This is traditionally achieved by requiring a user to present login and password credentials before allowing such a user to issue commands against any network devices.

However, complexity in modern computer networking environments may present challenges to traditional security measures. For example, in a modern computer network environment, configuration information used to set up a network may be received from many sources and propagate across numerous software applications before arriving at a particular network device or devices. This opens the door for unauthorized modification of configuration information that may result in unwanted or even damaging operations on the computer network.

Accordingly, techniques for improving security when configuring network devices can be advantageous in ensuring computer network integrity.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

DETAILED DESCRIPTION

Described herein are techniques for improving network security by cryptographically signing network configurations. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Figure 1:
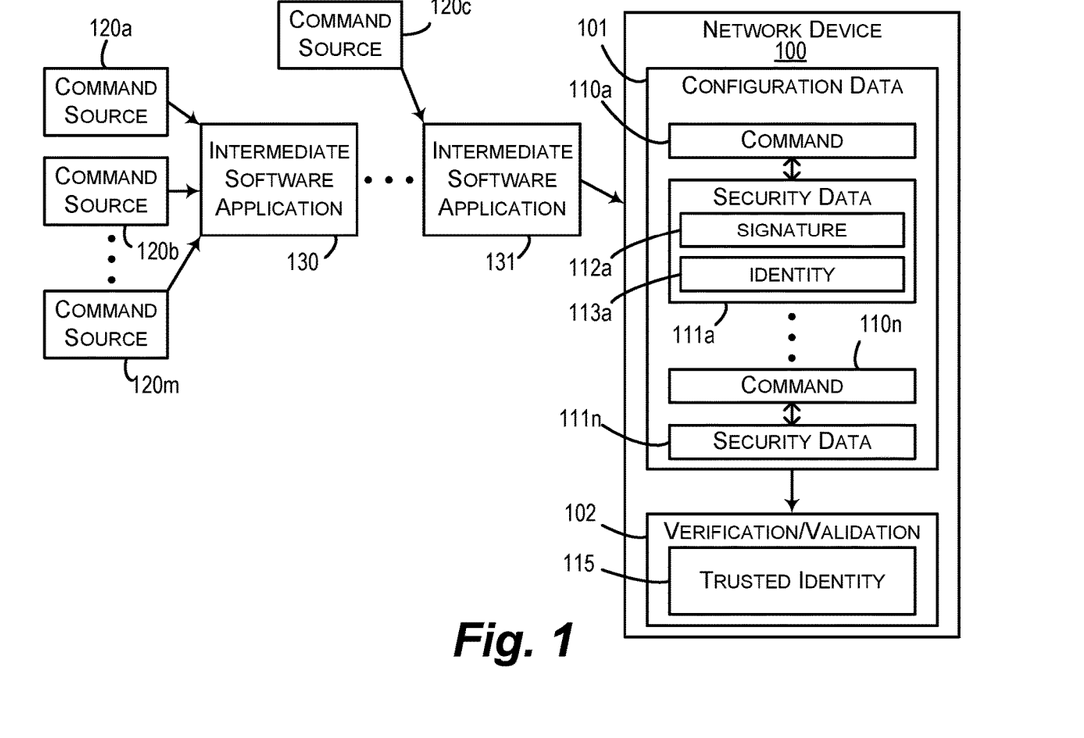
FIG. 1 illustrates a network security architecture according to an embodiment.

FIG. 1 illustrates a network security architecture according to an embodiment. Network device 100 may be configured to perform a variety of network operations. Network device 100 receives configuration data 101 comprising various commands 110a-n, which when executed by the network device cause the network device to perform corresponding operations, for example, configuring a flow of network traffic through the network device. Commands 110a-n may be received in network device 100 from a variety of command sources 120a-m across a plurality of intermediate software applications 130-131 either directly or indirectly over a network (not shown). Command sources 120a-m may include users (e.g., network administrators) or programs, such as programs that analyze flow data, threat data, application quality metrics, and change ticket software, for example. Ideally, command sources 120a-m are authorized command sources. However, in some cases a command may be initiated or modified by an unauthorized command source (e.g., a user or program). The command sources 120a-m may issue a command to network device 100, and the command may flow through one or more software applications before arriving at network device 100. Accordingly, there exists the possibility that the command may be issued by an unauthorized source or altered between an authorized command source and the network device.

Features and advantages of the present disclosure include securing transactions in a network device by associating commands with security data. Here, commands 110a-n may be associated with security data 111a-n. When a command is created by a command source 120a-m, the command may be cryptographically signed to produce security data 111a-n, for example, and the command is associated with the security data at the time it is created. Cryptographic signatures may be generated using X.509, Pretty Good Privacy (PGP), RSA, elliptic-curve cryptography, or the like, for example. The commands 110a-n and associated security data 111a-n may propagate from each command source 120a-n, across intermediate software applications 130-131, to network device 100, where commands 110a-n and associated security data 111a-n (e.g., now aggregated) may be received together by network device 100. The commands 110a-n may be accessible to other users as they propagate through the system, and the associated security data may be paired with the commands to ensure that commands initiated by authorized users are executed by network devices without being altered by other users or malicious programs, for example.

As the commands move between intermediate software applications 130-131, the integrity of the commands and security of the network is maintained by the security data. More specifically, when the commands 110a-n are executed on network device 100 to configure the network device, information in the security data may be used to ensure that the commands were issued by authorized sources and not altered between the command source 120a-m and network device 100. In one embodiment, security data associated with a command may comprise a signature 112a and information identifying the signer ("identity") 113a. Network device 100 may include verification/validation software 102, which receives the commands and associated security data and verifies and/or validates the commands prior to execution of the commands.

For example, network device 100 may validate identities 113a-n based on a known, trusted identity 115 configured on the network device. For example, in one example embodiment described below the known, trusted identity may be a root of trust. Additionally, in one example embodiment described below, the security data may comprise a certification that may be used to verify the identity of the signer of the command.

When a particular identity 113a is validated, network device 100 verifies that a command corresponding to the verified identity was not altered. Verification of the command may be based on a second command in the security data (e.g., a hashed command) associated with the particular signature. For example, the security date may include an encrypted value, which when cryptographically decrypted may be used to verify that a particular command was not altered as it propagated from a command source 120a-m.

Accordingly, when one or more of the plurality of commands 110a-n are validated, the validated commands are executed on the network device. In contrast, when an identity 113a-n associated with at least one of the commands 110a-n is not verified, the commands associated with the unverified identity are not executed. Further, when network device 100 does not validate that one of the commands 110a-n was not altered, the non-validated commands are not executed. Thus, when commands are received from unauthorized command sources, the identities are not validated and the commands are not executed. Further, when intermediate software applications 130-131 receive commands from a first authorized command source, and a second command source modifies one of the commands, the command is not verified and not executed on the network device.

Figure 2:
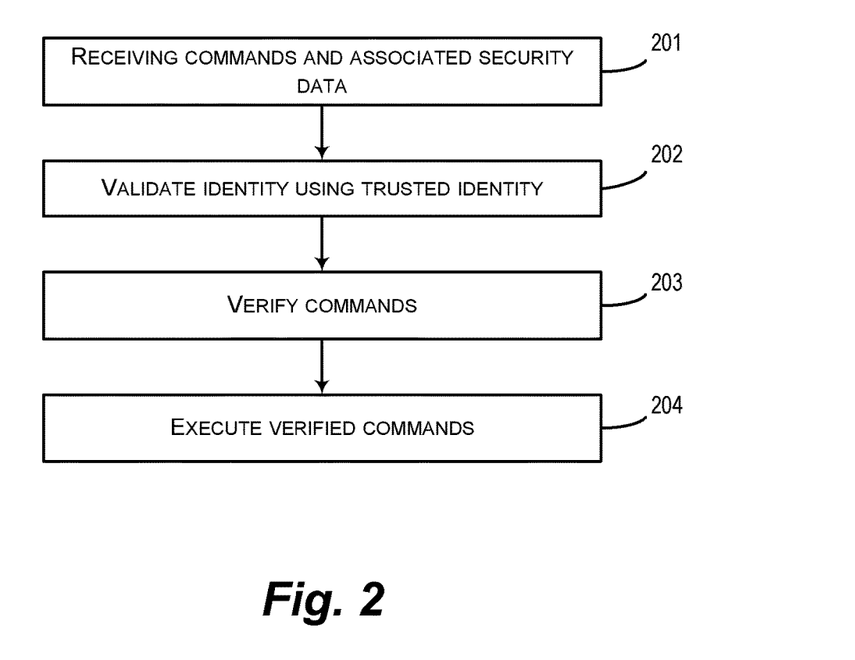
FIG. 2 illustrates a method of securing a network according to an embodiment.

FIG. 2 illustrates a method of securing a network according to an embodiment. At 201, commands and associated security data (e.g., a signature and identity) are received in a network device. The commands and associated security data may be received from across a number of intermediate software applications from command sources, such as users or other programs. At 202, the network device validates the identity of a signer based on a trusted identity. At 203, when a particular identity is verified, the network device verifies that a command corresponding to the verified signature was not altered. The verification may be based on a hashed command in the security data (e.g., an encrypted hashed command) associated with the particular command, for example. Validated and verified commands are then executed by network device.

Figure 3:
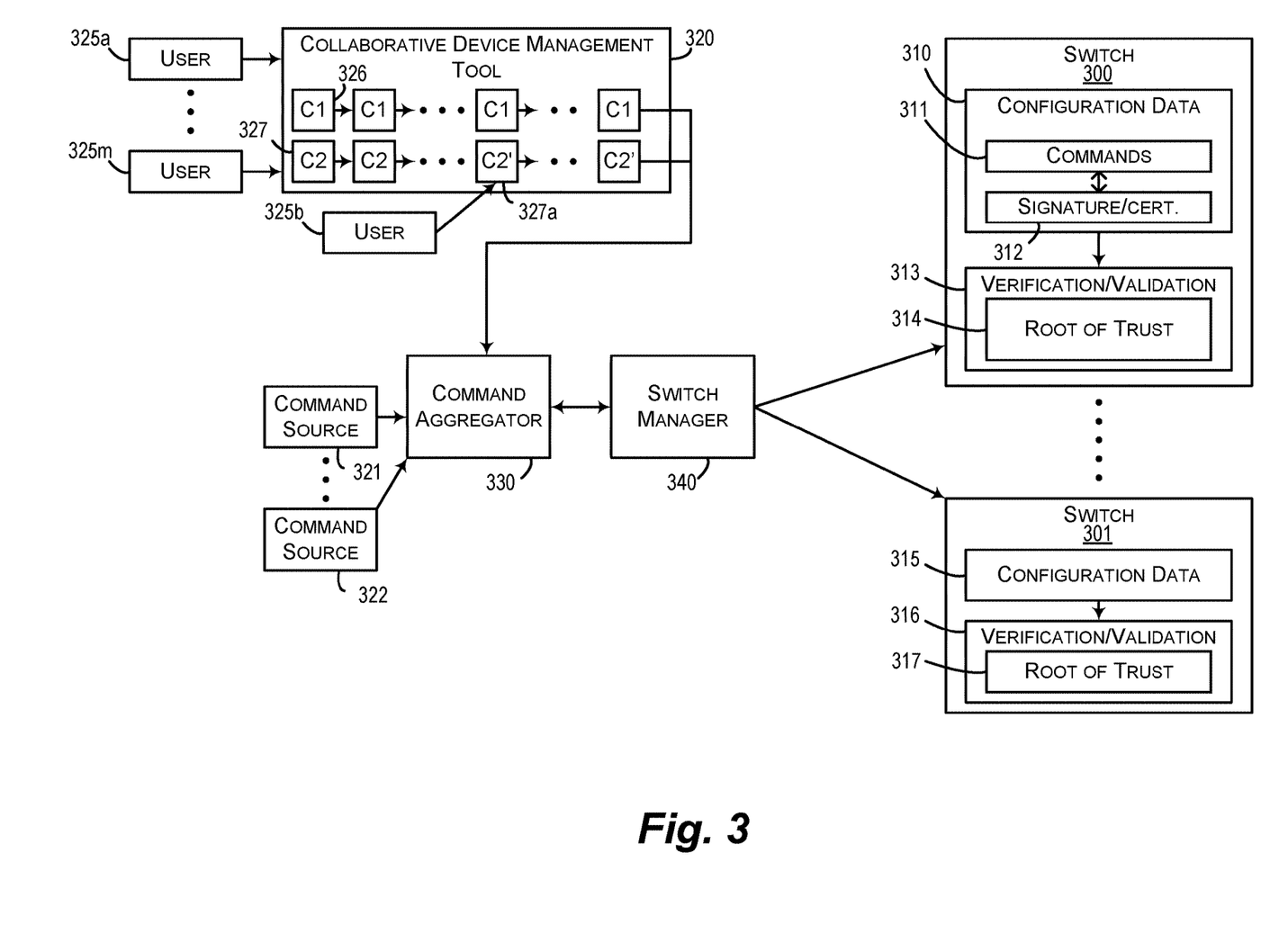
FIG. 3 illustrates an example network security architecture according to an embodiment.

FIG. 3 illustrates an example network security architecture according to an embodiment. In this example, network devices, such as network switches 300-301, may receive secure configuration data 311 and 315 to configure the operation and behavior of each switch. Configuration data may be received from command sources 321-322, including users 325a-m, over a collaborative device management tool 320, a command aggregator software application 330, and a switch manager software application 340.

In this example embodiment, users may enter network configuration commands into collaborative device management tool 320. Collaborative device management tool 320 may be a Trello® board, for example, and is merely illustrative (and not limiting) example of how commands may be generated and modified as they pass through multiple software applications to a network device. The commands may be cryptographically signed and associated with a signature and certificate to prevent modification of the command. For example, user 325a may generate and cryptographically sign a command C1 326, which propagates through tool 320. Other users may view the command over a number of steps, and the unmodified command C1 may exit tool 320 without modification. Conversely, user 325a may generate cryptographically signed command C2 327. As mentioned above, the command and associated security data may propagate across multiple software systems such that the command is accessible to other users. In this example, another user 325b may modify command C2 to produce modified command C2' 327a. Unmodified command C1 and modified command C2' are aggregated in command aggregator 330. Command aggregator 330 may be a software application to aggregate commands from different sources into one set of configuration data, record and replay commands (e.g., multiple commands to shut off traffic to a switch), perform authorization checks, and other functions, for example. An example command aggregator 330 may be implemented using the Red Hat® Ansible® Automation Platform and is merely another illustrative (and not limiting) example of how commands may be generated and modified as they pass through multiple software applications to a network device.

Switch manager 340 may receive aggregated commands from command aggregator 330. Switch manager 340 may monitor the health, status, and state of switches 311/315, and push configuration data to switches 311/315 and feed-back status information to command aggregator 330, for example. Switch manager 340 may be a network-wide workload orchestration and workflow automation software system for managing switches, for example. In one embodiment, switch manager 340 includes an interface configured to receive and send configuration data including commands, signatures, and certificates, for example, as illustrated further below.

Switches 300-301 receive aggregated cryptographically signed commands and security data from switch manager 340. The commands and security data may be received as a JSON object, for example, and include a command, a certificate, and a signature. In other embodiments, commands and security data may be received by a network device or passed between software systems as XML, ASN.1, YAML, or the like, for example. The following is an example pseudo-code for a cryptographically signed command and associated security data (e.g., signature and certificate) according to an embodiment:

{
    Command | "<command>"
    Signature | "439801890438jfklsu9ofpieopjqiopjfjso-
       904859 r043"
    Certificate | "----BEGIN CERTIFICATE----\ n43k-
       l3423jkl;r2k353j376148jk;l . . . jkl;13j164jk16-
       w69jglw95=\n----END CERTIFICATE----"
}

Switches 300-301 may receive the aggregated commands and security data and process the configuration data in verification/validation software components 313/316. For each signed command, verification/validation software 313/316 may validate that the certificate is from a command source having authority from a root of trust system configured on each switch. A root of trust is an entity that issues keys for generating cryptographic signatures. A system configured with a root of trust (RoT) may determine the set of commands to trust, based on whether or not the origin of the commands comes from a source whose identity can be traced to the RoT. The RoT is a configuration to the compute engine controlling, in part, the processor on the network device it is embedded in. Once the certificate is verified, the signature may be decrypted to extract a hash value of the command generated by the command source. The signature may be decrypted using a public key of the signer, for example. In some embodiments, the public key to perform the decryption may be embedded in the security data (e.g., as metadata included with the signature). In another embodiment, the public key of the signer is stored on the network device (e.g., configured on the switch in advance as part of the root of trust configuration). The hash value may be compared to a hash of the command in the received configuration file (e.g., the command in the pseudo-code file above). If a hash of the received command matches the hash value of the command extracted from the certificate, then the command has not been modified and the received command is executed by the switch. If the identity is not validated or if the hash values of the commands do not match, the command is deemed not authentic and is not executed by the switches. All the aggregated commands may be processed using this technique and only the validated and verified commands are executed.

For example, as mentioned above, command C1 326 and associated security data may have propagated unaltered from an authorized initiating user across collaborative device management tool 320, command aggregator 330, and switch manager 340. Accordingly, when the command C1 and the associated security data are processed by a verification/validation component of a switch, the initiating user is validated (e.g., when the initiating user is authorized to issue commands to the switch). Next, in this example, the command C1 326 is verified as unaltered. Accordingly, command C1 326 is executed by the switch. However, in this example, command C2 327 is altered to produce command C2' 327a, which is still associated with the same security data as command C2 327. Command C2' 327a and associated security data propagate across collaborative device management tool 320, command aggregator 330, and switch manager 340. Accordingly, when the command C2' 327a and associated security data are processed by a verification/validation component of a switch, the initiating user may be verified (e.g., if user 325b is authorized to issue commands to the switch). However, in this case the command is not validated because it has been altered. For example, a hash value of command C2' 327a received by the switch does not match the hash of original command C2 327, which was encrypted in the signature of the security data. Accordingly, command C2' 327a is not executed by the switch.

Figure 4:
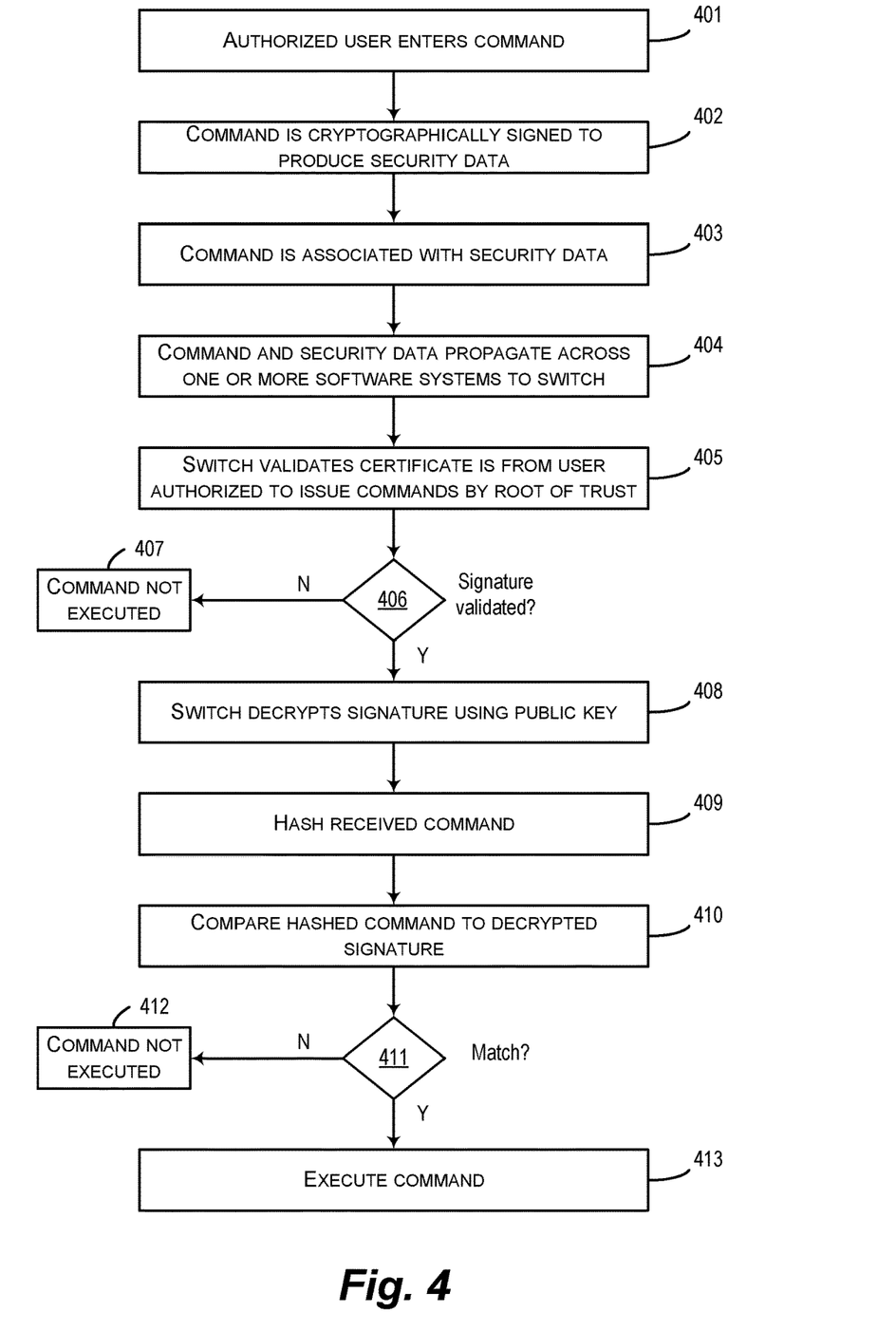
FIG. 4 illustrates an example network security method according to an embodiment.

FIG. 4 illustrates an example network security method according to an embodiment. At 401 an authorized user enters commands for a network switch or any other network device that has network traffic switching, or routing, or generally, forwarding capabilities (herein, "switch") into a software system. At 402, the command is cryptographically signed to produce security data. The security data may comprise a cryptographic signature and certificate. At 403, the command and security data are associated. The command and security data may be linked together, such as being embedded in fields of a JSON object, for example. At 404, the command and security data propagate across one or more software systems and are received together by the switch. At 405, the switch validates the certificate is from a user authorized to issue commands by a root of trust configured on the switch. At 406, validation software on the switch determines if the certificate associated with the command is from a source authorized to issue commands by a root of trust. If not, then the command is not executed at 407. If the certificate is verified, then the switch decrypts the signature in the security data using a public key to produce a hashed command value at 408. At 409, the received command is hashed using the same hash function used to hash the command in the signature. At 410, the hashed command from the signature is compared to the hash of the received command. At 411, verification software on the switch determines if the hash values match. If the values do not match (e.g., because the received command was altered), the received command is not executed at 411. If the values match, then the received command is executed at 412.

Figure 5:
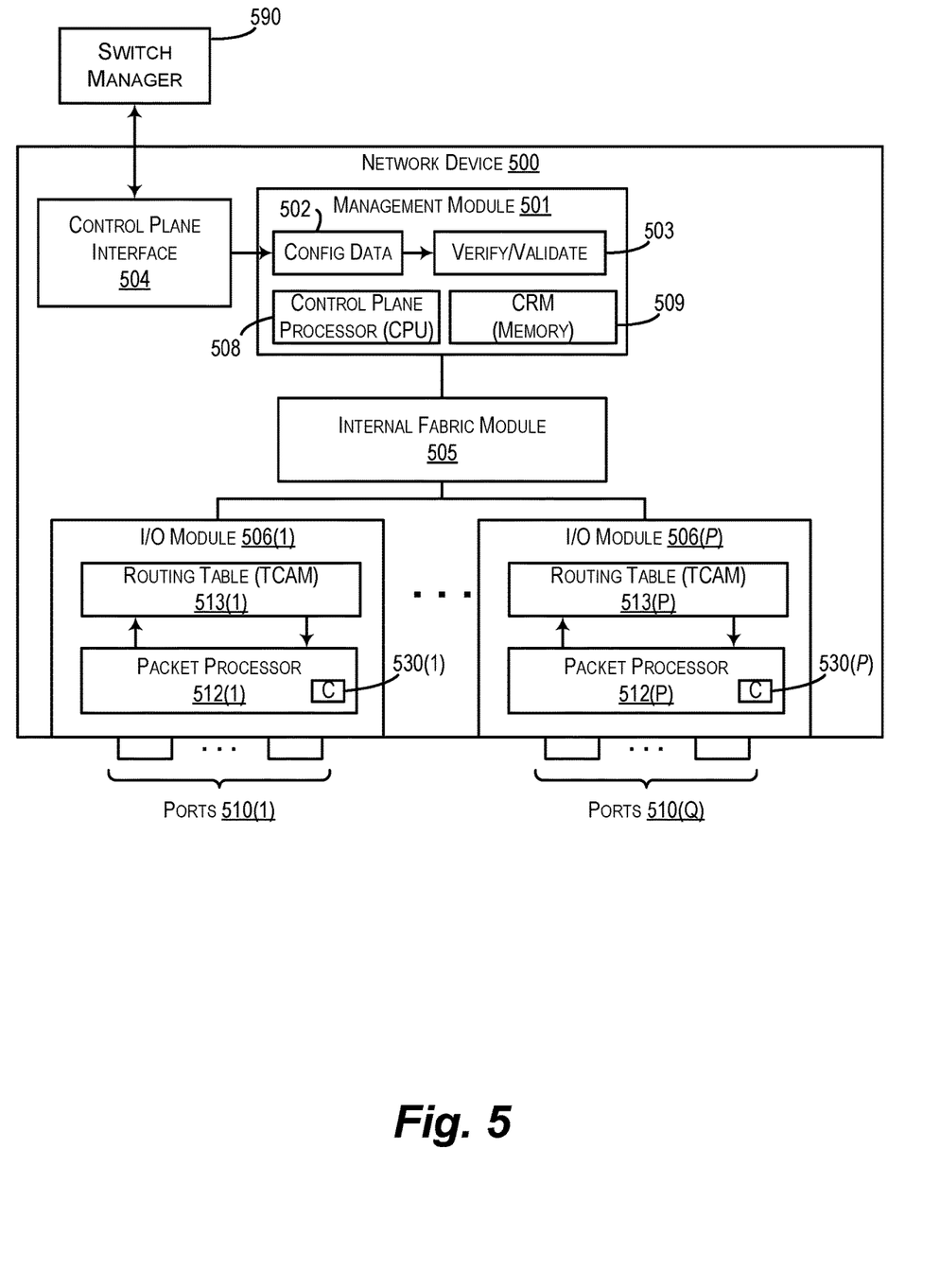
FIG. 5 illustrates an example network device according to an embodiment.

FIG. 5 illustrates an example network device 500 that may be illustrative of a network device in certain embodiments. As shown, network device 500 includes a control plane interface 504, a management module 501, an internal fabric module 505, and a number of I/O modules 506(1)-506(P). Management module 501 (sometimes referred to as a control plane) includes one or more control plane processors (e.g., CPUs) 508 for managing/controlling the operation of the device. Each control plane processor 508 can be a general purpose processor, such as an Intel/AMD x86 or ARM-based processor, for example, that operates under the control of software stored in an associated non-transitory computer readable medium (CRM), which may include random access memory (e.g., SRAM and/or DRAM), solid state memory, an external disk drive (not shown), or the like. Management module 501 may receive configuration data 502 (e.g. commands executed by CPU 508 or sent to packet processors) from a network device manager (e.g., a switch manager) 590 over a control plane interface 504 (e.g., an Ethernet interface or data bus). The configuration data 502 may include commands and associated security data which is verified and validated as described above by a verification/validation software module 503 executing on CPU 508. CPU 508 may implement verified and validated commands on one or more I/O modules 506(1)-506(P).

Internal fabric module 505 and I/O modules 506(1)-506(P) collectively represent the data, or forwarding, plane of network device 500. Internal fabric module 505 is configured to interconnect the various other modules of network device 500. Each I/O module 506(1)-506(P) includes one or more input/output ports 510(1)-510(Q) that are used by network device 500 to send and receive network packets. Each I/O module 506(1)-506(P) can also include a packet processor 512(1)-512(P). Each packet processor 512(1)-512(P) is a hardware processing component (e.g., an ASIC) that can make wire speed decisions on how to handle incoming or outgoing network packets. In certain embodiments, commands 530(1)-(P) executed by CPU 508 may be received within packet processors 512(1)-512(P) to configure the packet processors. In this example, I/O module 506(1)-506(P) further includes a routing table 513(1)-513(P), which may include a content addressable memory (CAM, such as a TCAM).

It should be appreciated that network device 500 is illustrative and many other configurations having more or fewer components than network device 500 are possible.

Figure 6:
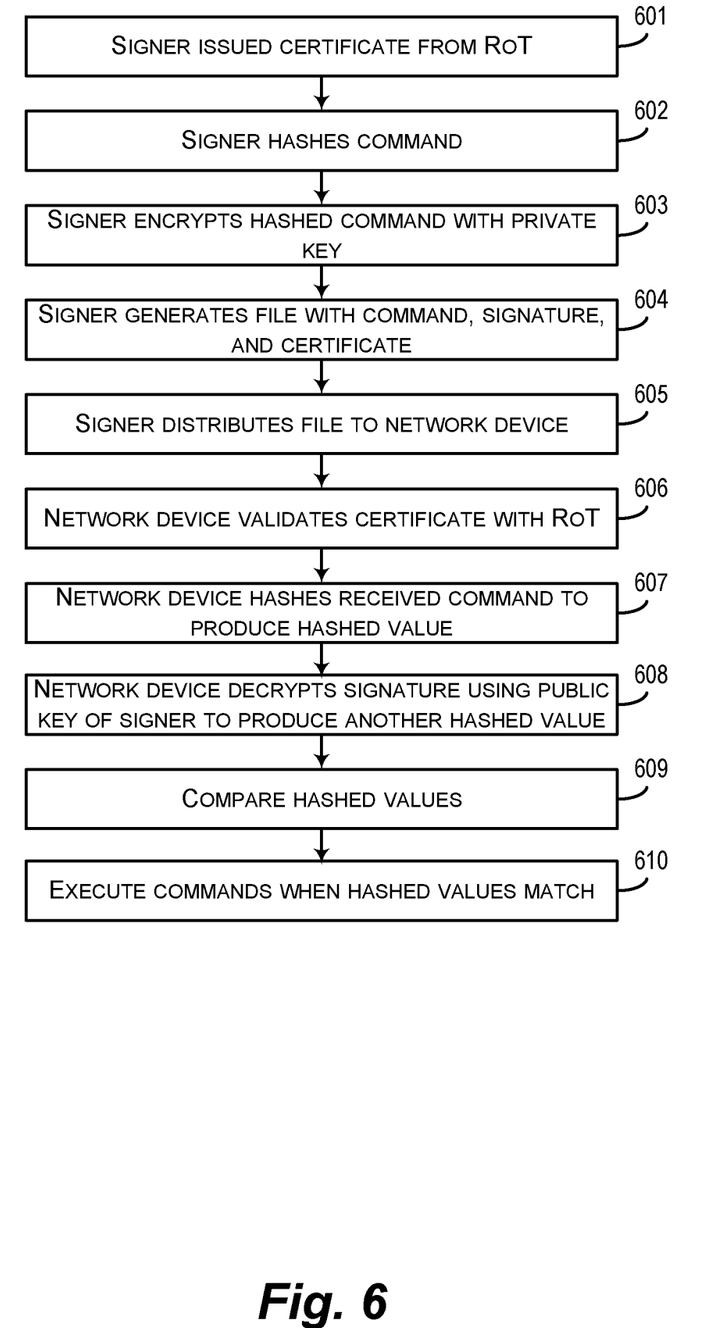
FIG. 6 illustrates an example secure transaction with a network device according to an embodiment.

FIG. 6 is an example of an authorized user issuing a command for execution on a network device according to another embodiment.

At 601, a user (aka a signer) has a certificate issued by a root of trust (e.g., their employer) to themself. The certificate is signed by the root of trust, states it is issued to signer, and contains the public portion (public key) of a private key available to the signer.

At 602, signer runs a hash function over the command (e.g., hash($data=command) to produce a hash value (e.g., $hashvalue, aka "hashed command value").

At 603, signer takes their private key and encrypts the hashed command value (e.g., encrypt($hashvalue, $private_key) to produce an encrypted value (e.g., $encrypted_value).

The signer may distribute the command, encrypted value (e.g., $data, $encrypted_value), and certificate as one document (e.g., JSON, XML, etc. . . . ). The $encrypted_value is an example of a "signature". The signature may be generated by signer using a private key associated with the certificate and root of trust to perform a signing step on the commands, for example. Signer may distribute their public key via other channels for signature verification. For example, a network device may store a public key from the root of trust to decrypt the signature ($encrypted_value).

Accordingly, at 604, signer generates a file (e.g., JSON, XML, etc. . . . ) comprising a command, signature, and a certificate from a root of trust. An example file is as follows:
 {"commands": ["show run",] "signature_info": {"signature": "0xf33df4c3", "certificate": "aGkgY2hhZCE="}}

At 605, signer passes the file, possibly through intermediate software systems, to the network device.

At 606, the network device (e.g., the verifying device, or "verifier") has been configured to only trust the same root of trust that authorized the signer. The verifying device receives the "certificate" value in the file (shown above) and validates that the certificate was signed by the same root of trust that the verifying device is configured to accept. This proves that the identity of the signer is a known and trusted identity, and the network device then uses the public key in the certificate, the signature, and the commands, to perform the signature verification.

At 607, the verifying device runs the same hash function over the received command that was used to hash the command sent by the signer (e.g., hash($data=command) to produce a second hash value (e.g., $hashvalue).

At 608, the verifying device takes the public key of the signer and decrypts the signature (aka encrypted value) from above (e.g., decrypt($encrypted_value, $public_key) to produce a second hash value (e.g., $hashvalue from signer).

At 609, the verifier checks that both hash values match (e.g., are equal; $hashvalue==$hashvalue from signer).

At 610, if the verification passes, the commands under "commands" field in the received file are executed.

The techniques described herein may be implemented using a variety cryptography methods. For example, other embodiments may use symmetric cryptography or Hash-based Message Authentication Code ("HMAC") based cryptography.

For example, in symmetric cryptography, an algorithm, such as AES is used with a per-user secret key. The key is issued to the user by a trusted source, and the key may be referred to as $key. A signer performs an operation to encrypt the command, such as AES_Encrypt('["show run",]', $key)=encrypted_command. The signer passes the data as something that identifies the user, such as {command=$encrypted_command, metadata={user_id= "erahn"}}. A verifier (e.g., a switch) looks up the user_id to find the configured $key and performs AES Decrypt($encrypted_command, $key)=command, and the verifier executes the command.

As another example, in HMAC cryptography (e.g., keyed-hash message authentication code or hash-based message authentication code), an algorithm, such as HMAC-SHA-256 is used with a per user secret value. The value is issued to the user by a trusted source, and which is referred to as $secret. A signer performs an operation to hmac the command, such as HMAC-SHA-256(["show run",]', $secret)=hmac_value. The signer passes the data as something that identifies the user, such as {command=["show run",]', metadata={user_id="erahn", hmac=$hmac_value}}. A verifier (e.g., a switch) looks up the user_id to find the configured $secret and performs HMAC-SHA-256(["show run",]', $secret)=hmac_value switch calculates. Then, the verifier checks that hmac_value==hmac_value switch calculates and if they are equal executes the commands on the switch, for example.

Further Examples

Each of the following non-limiting examples may stand on its own or may be combined in various permutations or combinations with one or more of the other examples.

In one embodiment, the present disclosure includes a method of securing transactions on a network device comprising: receiving, in a network device, a plurality of first commands each having associated security data, wherein the first commands, when executed, configure the network device, and wherein the security data comprises a signature and information identifying a signer; validating, by the network device, the information identifying the signer based on a trusted identity stored on the network device; when a particular information of the signer is validated, verifying that a corresponding first command was not altered based on the signature in the security data associated with the validated information of the signer; and when one or more of the plurality of first commands are verified, executing the one or more first commands on the network device.

In another embodiment, the present disclosure includes a method of securing transactions on a network device comprising: receiving, in a control plane processor of a network switch, a plurality of first commands each having associated security data, wherein the first commands, when executed, configure the network switch, and wherein the security data comprises a signature and certificate; verifying, by the network switch, the certificate based on a root of trust configured on the network device; when a particular certificate is verified, decrypting, by the network switch, a corresponding particular signature using a public key to produce a first hash value; generating a second hash value using a hash function on the network device applied to the first command associated with the verified certificate; comparing the first hash value to the second hash value; and executing the first command associated with the verified certificate on the network switch when the first hash value matches the second hash value, and not executing the first command associated with the verified certificate when the first hash value does not match the second hash value.

In another embodiment, the present disclosure includes a network device comprising: a control plane processor; a control plane interface to receive configuration information to configure a flow of network traffic through the network device; and a non-transitory computer readable medium storing program code, which when executed causes the network device to perform a process, the process comprising: receiving, in a network device, a plurality of first commands each having associated security data, wherein the first commands, when executed, configure the network device, and wherein the security data comprises a signature and information identifying a signer; validating, by the network device, the information identifying the signer based on a trusted identity stored on the network device; when a particular information of the signer is validated, verifying that a corresponding first command was not altered based on the signature in the security data associated with the validated information of the signer; and when one or more of the plurality of first commands are verified, executing the one or more first commands on the network device.

In one embodiment, when information identifying the signer associated with at least one of the first commands is not verified, the at least one of the first commands is not executed.

In one embodiment, when the network device does not verify that at least one of the first commands was not altered, the at least one of the first commands is not executed.

In one embodiment, the plurality of first commands are associated with the security data at a time the first commands are created by an authorized source of the first commands, and the plurality of first commands and associated security data are received together by the network device.

In one embodiment, the first commands are cryptographically signed by an authorized command source at the time the first commands are created to produce a cryptographic signature.

In one embodiment, the cryptographic signature uses at least one of X.509, Pretty Good Privacy (PGP), RSA, and elliptic-curve cryptography.

In one embodiment, the information identifying the signer is a certificate from the trusted identity.

In one embodiment, the trusted identity is a root of trust.

In one embodiment, the signature comprises a hashed command for verifying that the corresponding first command was not altered.

In one embodiment, verifying that the corresponding first command was not altered comprises: decrypting, by the network device, the signature associated with the corresponding first command using a public key of the signer to produce a first value; hashing the command to produce a second value; comparing the first value to the second value; and executing the corresponding first command on the network device when the first value matches the second value.

In one embodiment, the security data comprises the public key of the signer.

In one embodiment, the public key of the signer is stored on the network device.

In one embodiment, the plurality of first commands and associated security data are received from one or more command sources across a plurality of intermediate software applications.

In one embodiment, at least one of the plurality of intermediate software applications receives at least one command of the plurality of first commands from a first command source, and wherein a second command source modifies the at least one command, and wherein the at least one command is received, but not verified and not executed, on the network device.

In one embodiment, the plurality of first commands and associated security data are received from a network switch management software application, the network switch management software application receiving aggregated commands and associated security data for a plurality of network switches and forwarding different pluralities of commands and associated security data to different network switches.

In one embodiment, at least one of the first commands and associated security data are generated by one of: a user and a program.

In one embodiment, the at least one of the first commands and associated security data are generated in response to receiving at least one of: flow data, threat data, application quality metrics, and change tickets.

In one embodiment, the network device is a network switch.

The above description illustrates various embodiments along with examples of how aspects of some embodiments may be implemented. Accordingly, the above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method of securing transactions on a network device comprising:

receiving, in a network device, a plurality of first commands each having associated security data, wherein the plurality of first commands, when executed, configure the network device, wherein the security data associated with each command in the plurality of first commands comprises a signature and information identifying a signer, wherein the plurality of first commands and the security data associated with each command are received from a network device management software application that is designed to manage a plurality of network devices including the network device, and wherein the network device management software application receives the plurality of first commands and the security data associated with each command from one or more intermediate software applications that aggregate the plurality of first commands and the security data associated with each command from one or more command sources;

validating, by the network device, the information identifying the signer based on a trusted identity stored on the network device;

when a particular information of the signer is validated, verifying that a corresponding first command was not altered based on the signature in the security data associated with the validated information of the signer; and when one or more of the plurality of first commands are verified, executing the one or more of the plurality of first commands on the network device.

2. The method of claim 1, wherein when information identifying the signer associated with at least one of the plurality of first commands is not verified, the at least one of the plurality of first commands is not executed.

3. The method of claim 1, wherein when the network device does not verify that at least one of the plurality of first commands was not altered, the at least one of the plurality of first commands is not executed.

4. The method of claim 1, wherein the plurality of first commands are associated with the security data at a time the plurality of first commands are created by an authorized command source in the one or more command sources, and wherein the plurality of first commands and the security data associated with each command in the plurality of first commands are received together by the network device.

5. The method of claim 1, wherein the information identifying the signer is a certificate from the trusted identity.

6. The method of claim 1, wherein the trusted identity is a root of trust.

7. The method of claim 1, wherein the plurality of first commands and the security data associated with each command in the plurality of first commands originate from the one or more command sources.

8. The method of claim 1, wherein at least one of the one or more intermediate software applications receives at least one command of the plurality of first commands from a first command source, wherein a second command source modifies the at least one command, and wherein the at least one command is received, but not verified and not executed, on the network device.

9. The method of claim 1, wherein the network device is a network switch.

10. The method of claim 1 wherein the one or more intermediate software applications include a command aggregator application and a collaborative network device management tool that is connected to the command aggregator application.

11. The method of claim 1, wherein the plurality of first commands are cryptographically signed by an authorized command source in the one or more command sources at the time the plurality of first commands are created to produce a cryptographic signature.

12. The method of claim 11, wherein the cryptographic signature uses at least one of X.509, Pretty Good Privacy (PGP), RSA, and elliptic-curve cryptography.

13. The method of claim 1, wherein at least one of the plurality of first commands and the security data associated with the at least one first command are generated by one of: a user and a program.

14. The method of claim 13, wherein the at least one first command and the security data associated with the at least one first command are generated in response to receiving at least one of: flow data, threat data, application quality metrics, and change tickets.

15. The method of claim 1, wherein the signature comprises a hashed command for verifying that the corresponding first command was not altered.

16. The method of claim 15, wherein verifying that the corresponding first command was not altered comprises:
decrypting, by the network device, the signature associated with the corresponding first command using a public key of the signer to produce a first value;
hashing the command to produce a second value;
comparing the first value to the second value; and
executing the corresponding first command on the network device when the first value matches the second value.

17. The method of claim 16, wherein the security data comprises the public key of the signer.

18. The method of claim 16, wherein the public key of the signer is stored on the network device.

19. A method of securing transactions on a network switch comprising:
receiving, in a control plane processor of the network switch, a plurality of first commands each having associated security data, wherein the plurality of first commands, when executed, configure the network switch, wherein the security data associated with each command in the plurality of first commands comprises a signature and certificate, wherein the plurality of first commands and the security data associated with each command are received from a network switch management software application that is designed to manage a plurality of network switches including the network switch, and wherein the network switch management software application receives the plurality of first commands and the security data associated with each command from one or more intermediate software applications that aggregate the plurality of first commands and the security data associated with each command from one or more command sources;
verifying, by the network switch, the certificate based on a root of trust configured on the network device;
when a particular certificate is verified, decrypting, by the network switch, a corresponding particular signature using a public key to produce a first hash value;
generating a second hash value using a hash function on the network device applied to a first command associated with the verified certificate;
comparing the first hash value to the second hash value; and
executing the first command associated with the verified certificate on the network switch when the first hash value matches the second hash value, and not executing the first command associated with the verified certificate when the first hash value does not match the second hash value.

20. A network device comprising:
a control plane processor;
a control plane interface to receive configuration information to configure a flow of network traffic through the network device; and
a non-transitory computer readable medium storing program code, which when executed causes the network device to perform a process, the process comprising:
receiving, in the network device, a plurality of first commands each having associated security data, wherein the plurality of first commands, when executed, configure the network device, wherein the security data associated with each command in the plurality of first commands comprises a signature and information identifying a signer, wherein the plurality of first commands and the security data associated with each command are received from a network device management software application that is designed to manage a plurality of network devices including the network device, and wherein the network device management software application receives the plurality of first commands and the security data associated with each command from one or more intermediate software applications that aggregate the plurality of first commands and the security data associated with each command from one or more command sources;
validating, by the network device, the information identifying the signer based on a trusted identity stored on the network device;
when a particular information of the signer is validated, verifying that a corresponding first command was not altered based on the signature in the security data associated with the validated information of the signer; and
when one or more of the plurality of first commands are verified, executing the one or more of the plurality of first commands on the network device.

* * * * *